June 21, 1960
N. C. UECKER
2,941,305
FLIGHT INDICATOR HAVING PITCH TRIM
Filed July 19, 1957
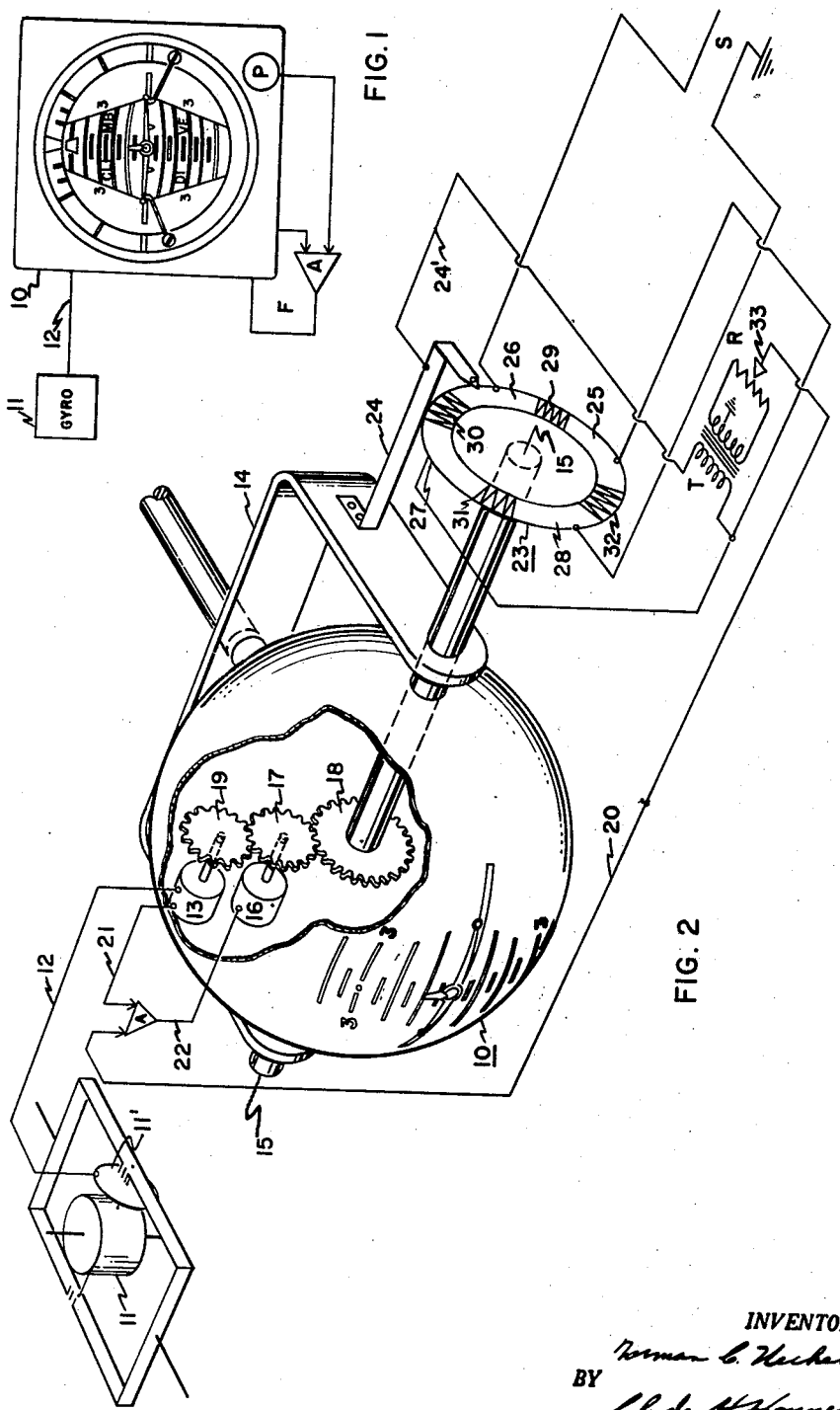
INVENTOR.
Norman C. Uecker
BY Clyde H. Haynes
his attorney.

United States Patent Office 2,941,305
Patented June 21, 1960

2,941,305
FLIGHT INDICATOR HAVING PITCH TRIM

Norman C. Uecker, Grand Rapids, Mich., assignor to Lear, Incorporated

Filed July 19, 1957, Ser. No. 673,020

8 Claims. (Cl. 33—204)

The present invention relates to attitude indicators convertible by the pilot to show generally horizontal flight path instead of attitude and to automatic conversion devices for automatically temporarily returning the indicator from flight path inclination indication to true attitude indication when the aircraft reaches a predetermined climb or dive flight path inclination or attitude.

Present day aircraft have an indicator in the cockpit which indicates to the pilot the attitude of the aircraft. The indicator is controlled by gyroscopes mounted in the aircraft which provide signals to the indicator to thereby indicate any deviations of the position of the aircraft relative to the axis of the gyroscope. In the present instance, the position of the pitch axis of the aircraft relative to the reference pitch axis which is established by the gyroscope is shown on the indicator. In this way if the aircraft tends to pitch so that its nose either points up or down relative to the horizon, such pitching is noted on the indicator.

Many times the pilot readjusts or alters the indicator and thus converts the indicator from a true attitude indicator to a flight path inclination indicator. For example, the aircraft may be flying in a level or horizontal flight path with its nose inclined up or down in the air a few degrees but the indicator shows that the plane is level because the pilot has trimmed or altered the indicator. It is common practice for a pilot to trim the indicator so that he may use the indicator as a flight path inclination indicator.

Such use is not dangerous when the plane is flying fairly level or substantially in a horizontal plane. However, if the pilot tries to make an immelman or loop or a vertical climb or dive, he may easily lose track of the true attitude of the aircraft since the indicator, if it has been altered, does not present the true attitude of the aircraft. If the pilot has trimmed the indicator for a horizontal flight path with its nose inclined upward and then proceeds into a vertical climb, the indicator will show that he is flying in a climb of say 75° or 80° when the true attitude of his plane is a vertical climb 90° to the horizon. When he climbs, the signals from the gyroscope still operate the indicator as if the indicator were set for true attitude to thereby cause a false position of the indicator which confuses the pilot.

In view of the foregoing, it is apparent that one of the objects of the present invention is to overcome the aforementioned problems and others.

Another of the objects of the present invention is to provide a gyroscope controlled attitude indicator system which may be converted by the pilot from a true attitude indication to a flight path inclination indication and which automatically converts to a true attitude indication when the craft reaches a predetermined climb or dive angle relative to the horizon.

Another object of the present invention is to provide a trim-fade device which automatically cancels out the trim applied to the indicator by the pilot after the degree of climb has reached a certain predetermined degree so that the indicator then stops showing flight path inclination and starts showing the true attitude of the aircraft. From this point of climb on to vertical, the indicator shows the true attitude so that when the pitch axis of the aircraft is actually pointed in the vertical direction, the indicator shows that the pitch axis is pointed in a vertical direction and not in some other direction.

A further object of the invention is to provide an economical, efficient and fool-proof method whereby an indicator is automatically converted from a flight path inclination indicator to a true attitude indicator at predetermined attitudes of flight.

Further objects and aims of the present invention will become apparent from the preferred embodiment thereof in which an attitude indicator is controlled by signals from a signal generator, such as a gyroscope or other inertial controlling means. In this case reference will be had to the pitch axis of the aircraft and the pitch axis of the gyroscope with the indicator showing the position of the pitch axis of the aircraft relative to the horizon as established by the gyroscope. The indicator or the system has a manually operable trim device coordinated with the signals from the gyroscope and with the position of the indicator in such manner that the indicator may be manually positioned or the indicator may be altered or converted from showing true attitude indications to showing flight path inclination indications when the aircraft is flying in generally level flight. The trim device is electrically responsive to the true position of the pitch axis of the aircraft and is connected to provide signals when the pitch axis reaches a predetermined angular position relative to level flight. These signals are connected to be coordinated with the signals from the gyroscope to convert the indicator from a flight path inclination indicator to an attitude indicator until the aircraft pitch axis again is generally horizontal. Thus, there is provided a gyroscopically controlled attitude indicator system which may be converted by the pilot from a true attitude indication to flight path inclination indication when the craft is flying generally level and which automatically converts to a true attitude indication when the craft reaches a predetermined climb or dive angle relative to the horizon. It is understood that the terms "generally horizontal" and "generally level" flight refer to and include flight path inclinations or attitudes wherein the pitch axis of the aircraft is at or within a few degrees of a horizontal plane relative to the horizon or the ground.

The invention may take physical form in the specific example as hereinafter described for purposes of clarification and not of limitation, in conjunction with the accompanying drawings in which:

Figure 1 is a schematic illustration showing the features of the invention, and

Figure 2 is a plan view, partly in schematic illustration, of a preferred embodiment of the invention.

Referring now to the drawings, there is illustrated for purposes of clarity and exemplification and not of limitation, a flight indicating system having pitch trim. An indicator 10, which is visible to the pilot, is connected to and responds to signals from a pitch gyroscope 11, the transmission of the signals being represented by line 12. The commonly used follow up servo circuit and its amplifier A are attached to the indicator as well as to the manually operable pitch trim device P. In this instance, however, the signals from the pitch trim device are cancelled out or faded out when the aircraft climbs above or dives below a certain angle relative to level flight. A specific example of structure to accomplish this is illustrated in Figure 2 wherein the indicator 10, which is visible to the pilot to show his attitude, responds to the pitch gyroscope 11 by means of gyroscope originated signals in line 12 established by synchro transmitter 11' and a synchro receiver 13. The indicator 10 is rotatably mounted on a gimbal 14 for rotation about an axis 15. Indicator 10 is mounted to be rotated by a servo motor 16 having a gear 17 in driving connection with a gear 18 on indicator 10 and a gear 19 on synchro receiver 13.

The details of the wiring and construction of the synchros have been omitted to make the present disclosure brief and clear since these parts are well known in the art and their purpose of transmitting signals for such purposes is well understood by those skilled in the art. Thus, the representing of signal 12 and other signals by a line is for illustrative purposes only.

Rotation of the servo motor 16, to move the indicator, is obtained by sending a signal through line 21 from synchro 13, thence through amplifier A and to the servo motor 16. Pitch trim, such as commonly used, is obtained by injecting a pitch trim signal from line 20 into the amplifier A so that the pitch trim signal combines with the signal in line 21 from servo 13 to thereby provide a signal in line 22 and into servo motor 16. The pitch trim signal in line 20 is obtained from the following structure:

A pitch trim fade resistance ring 23 and a wiper arm 24 are mechanically associated with the indicator 10 and gimbal 14 whereby movement of indicator 10 relative to gimbal 14 causes corresponding movement between ring 23 and arm 24. This movement operates a signal in line 24' which is connected into a suitable transformer T to cause the signal in line 20. The ring 23 has certain portions 25, 26, 27 and 28 of its windings shorted out and other portions 29, 30, 31 and 32 thereof of a high resistance so that as the gyroscope dictates the attitude of the aircraft to the indicator, one or another of these portions will be in contact with the wiper arm 24.

The resistance ring 23 has shorted out winding portions 26 and 28 which are diametrically opposite each other connected respectively to opposite sides of a source of electrical energy S and shorted out winding portions 25 and 27 electrically connected together and to one end of the primary side of transformer T, the other end of which is connected to the wiper 24. The secondary side of transformer T is connected in series with a potentiometer resistance R. The transformer secondary, at a point between the ends thereof, and one side of the source of energy S are grounded. A contact 33 on resistance R provides means for transmitting the signal through line 20 from the transformer T, into which it was fed by the position of wiper 24 on ring 23.

In this way the pilot can set his indicator for operation as a flight path inclination indicator during normal flight by suitable adjustment presently in use. However, if the pilot automatically changes the attitude, for example, to fly vertically instead of horizontally, the wiper arm 24 moves from one portion to another portion of the ring, thus cancelling out or altering the pitch trim signal to cause the indicator to show true attitude position until the plane has completed a maneuver to a point where the wiper arm contacts a portion of the ring in such manner that the pitch trim signal is again applied to the indicator to cause it to show flight path inclination and not true attitude.

Although the present invention has been described with a certain degree of particularity, it is understood that various modifications and arrangements of details in the parts may be had without departing from the spirit and scope of the invention and that such modifications, arrangements or alterations are included in the invention as hereinafter claimed.

I claim:

1. In an indicating system for aircraft, an attitude indicator to indicate the attitude of the aircraft, inertial means controlling said indicator and causing said indicator to display the pitch axis position of the plane relative to the pitch axis of the inertial means, first means altering said indicator and causing it to show a flight path inclination different from the dictations of the inertial means, and second means responsive to movement of said indicator beyond a pre-determined angular movement relative to the pitch axis of the inertial means to cancel said first means and cause said indicator to show true pitch attitude of the aircraft as dictated by the inertial means.

2. In an indicating system for aircraft having an attitude indicator to indicate the attitude of the aircraft, inertial means controlling said indicator and causing said indicator to display the position of the plane relative to its pitch axis, and trim means altering said indicator and causing it to show a flight path inclination different than the dictations of the inertial means; means responsive to movement of said indicator beyond a pre-determined angular movement to render inoperative said trim means and cause said indicator to show true attitude position of the aircraft relative to the pitch axis and as dictated by the inertial means.

3. In an indicating system for aircraft, an attitude indicator to indicate the attitude of the aircraft, an electrically operated servo connected to said indicator to position the same at various angular positions about its axis, inertial means electrically controlling said servo, trim means in electrical circuit with said servo and said inertial means for causing said indicator to show a flight path inclination different from the dictations of said inertial means, and electrical resistance means responsive to movement of said indicator beyond a pre-determined angular movement to render inoperative said trim means and cause said indicator to show true attitude position of the aircraft as dictated by the inertial means.

4. In combination with an aircraft attitude indicator, inertial means controlling said indicator, a manually operable device for adjusting said indicator to cause said indicator to show true attitude of the aircraft or flight inclination of the aircraft relative to the pitch axis of the aircraft, and means associated with said device and said indicator and responsive to said indicator to render said device operative when the indicator is at one position and inoperative when the indicator is at another position thereby causing said indicator when in said one position to show flght path inclination of the aircraft and when in said another position to show true attitude.

5. In combination: an aircraft attitude indicator; inertial means adapted to generate electrical signals for controlling said indicator; a manually operable current controlling device for adjusting said indicator to cause said indicator to show true attitude of the aircraft or flight path inclination of the aircraft relative to the pitch axis of the aircraft; means including current conducting portions and current resistive portions in electrical circuit with said device and said indicator and responsive to the position of said indicator, connected to cause said indicator when in one position to show flight path inclination of the arcraft and when in another position to show true attitude.

6. In combination: inertial controlling means adapted to generate electrical attitude signals; an aircraft pitch attitude indicator connected to be controlled by electrical signals from said inertial controlling means; a manually operable pitch trim device to cause said indicator to show true pitch attitude of the aircraft or flight path inclination of the aircraft; current resistive means adapted to be positioned by the position of said inertial controlling means, connected in electrical circuit to generate electrical signals which are combined with the electrical signals from said inertial controlling means and said pitch trim device to cause said indicator when in one position to show flight path inclinaton of the arcraft and when in another position to show true attitude.

7. An indicator system for aircraft, comprising a gimbal, an indicator member pivotally mounted therein for angular movement, a servo for pivoting said member, a gyro controlling said servo and causing it to pivot in accordance with movement of the aircraft relative to its pitch axis, first means coupled with said gyro and servo to cause said indicator to show flight path inclination when the indicator is within a predetermined angular position relative to the gimbal, and second means coupled to said servo and responsive to movement of said indicator beyond said predetermined angular position relative to the gambal to cause said indicator to show pitch attitude of the aircraft.

8. An indicator system for aircraft, comprising a gimbal, an indicator member pivotally mounted therein for angular movement, a servo for pivoting said member, a gyro controlling said servo and causing it to pivot in accordance with movement of the aircraft relative to its pitch axis, first means coupled with said gyro and servo to cause said indicator to show flight path inclination when the indicator is within a predetermined angular position relative to the gimbal, and second means coupled to said servo and responsive to movement of said indicator beyond said predetermined angular position relative to the gimbal to cause said indicator to show pitch attitude of the aircraft, said second means including a rheostat in electrical circuit with said servo and mechanically associaed with said gimbal and indicator member.

References Cited in the file of this patent

UNITED STATES PATENTS

| | | |
|---|---|---|
| 2,080,490 | Kollsman | May 18, 1937 |
| 2,572,044 | McCarthy et al. | Oct. 23, 1951 |
| 2,652,545 | Halfhill | Sept. 15, 1953 |